United States Patent
Gumaer

(10) Patent No.: US 9,214,855 B2
(45) Date of Patent: Dec. 15, 2015

(54) ACTIVE POWER FACTOR CORRECTION CIRCUIT FOR A CONSTANT CURRENT POWER CONVERTER

(71) Applicant: Traver Gumaer, Easthampton, MA (US)

(72) Inventor: Traver Gumaer, Easthampton, MA (US)

(73) Assignee: Cooper Technologies Company, Houston, TX (US)

( * ) Notice: Subject to any disclaimer, the term of this patent is extended or adjusted under 35 U.S.C. 154(b) by 141 days.

(21) Appl. No.: 13/887,200

(22) Filed: May 3, 2013

(65) Prior Publication Data

US 2014/0328096 A1    Nov. 6, 2014

(51) Int. Cl.
*H02M 7/217*    (2006.01)
*H02M 1/42*    (2007.01)

(52) U.S. Cl.
CPC ............ *H02M 1/4225* (2013.01); *Y02B 70/126* (2013.01)

(58) Field of Classification Search
CPC ......... H02M 5/40; H02M 5/42; H02M 5/453; H02M 5/458; H02M 7/00; H02M 7/02; H02M 7/04; H02M 7/21; H02M 7/217
USPC .......... 363/44, 45, 82, 89, 126; 323/205, 207, 323/222
See application file for complete search history.

(56) References Cited

U.S. PATENT DOCUMENTS

| | | | |
|---|---|---|---|
| 4,386,395 A | 5/1983 | Francis, Jr. | |
| 4,683,529 A | 7/1987 | Bucher, II | |
| 5,367,247 A * | 11/1994 | Blocher et al. | 323/222 |
| 5,568,041 A * | 10/1996 | Hesterman | 323/207 |
| 5,598,326 A * | 1/1997 | Liu et al. | 363/34 |
| 5,614,812 A | 3/1997 | Wagoner | |
| 5,631,550 A | 5/1997 | Castro et al. | |
| 5,650,925 A * | 7/1997 | Hesterman | 363/132 |
| 5,682,306 A | 10/1997 | Jansen | |
| 5,804,950 A | 9/1998 | Hwang et al. | |
| 5,838,181 A * | 11/1998 | Hesterman | 327/175 |
| 5,844,399 A | 12/1998 | Stuart | |
| 6,043,633 A | 3/2000 | Lev et al. | |
| 6,177,782 B1 | 1/2001 | L'Hermite et al. | |

(Continued)

FOREIGN PATENT DOCUMENTS

| | | |
|---|---|---|
| JP | 2001037252 | 2/2001 |
| JP | 2010115088 | 5/2010 |

(Continued)

OTHER PUBLICATIONS

Lopatkina, R., International Search Report and Written Opinion of the International Searching Authority for PCT/US2014/036248, Sep. 4, 2014, pp. 1-7.

(Continued)

*Primary Examiner* — Adolf Berhane
(74) *Attorney, Agent, or Firm* — King & Spalding LLP

(57) ABSTRACT

The present disclosure provides techniques for power factor correction on a constant current system. In an example embodiment, the present disclosure provides a power factor correction circuit which receives a constant current power input. The power factor correction circuit provides an input voltage tuned to match the phase of the input current. The input voltage is tuned via charging and draining an input capacitor by a switching device. The switching device is driven on a duty cycle synchronously associated with the input current waveform.

17 Claims, 4 Drawing Sheets

(56) References Cited

U.S. PATENT DOCUMENTS

| | | |
|---|---|---|
| 6,259,613 B1 | 7/2001 | Lee et al. |
| 6,657,417 B1 | 12/2003 | Hwang |
| 6,906,503 B2 | 6/2005 | Lopez-Santillana et al. |
| 6,909,622 B2 | 6/2005 | Weng |
| 7,088,079 B2 | 8/2006 | Lefedjiev |
| 7,180,273 B2* | 2/2007 | Bocchiola et al. ............ 323/207 |
| 7,205,749 B2 | 4/2007 | Hagen et al. |
| 7,269,038 B2 | 9/2007 | Shekhawat et al. |
| 7,279,876 B2* | 10/2007 | Adragna et al. ............. 323/284 |
| 7,323,851 B2* | 1/2008 | Markowski .................... 323/222 |
| 7,394,236 B2 | 7/2008 | Chapuis et al. |
| 7,456,621 B2 | 11/2008 | Leung et al. |
| 7,489,116 B2 | 2/2009 | Lanni |
| 7,554,310 B2 | 6/2009 | Chapuis et al. |
| 7,723,964 B2 | 5/2010 | Taguchi |
| 7,746,040 B2 | 6/2010 | Garrity et al. |
| 7,777,459 B2 | 8/2010 | Williams |
| 7,821,237 B2 | 10/2010 | Melanson |
| 7,889,517 B2 | 2/2011 | Artusi et al. |
| 7,919,958 B2 | 4/2011 | Oettinger et al. |
| 8,014,176 B2 | 9/2011 | Melanson et al. |
| 8,076,920 B1 | 12/2011 | Melanson |
| 8,094,472 B2 | 1/2012 | Chang et al. |
| 8,125,197 B2 | 2/2012 | Hwang et al. |
| 8,129,958 B2 | 3/2012 | Ku et al. |
| 8,130,522 B2 | 3/2012 | Maksimovic |
| 8,207,713 B2 | 6/2012 | Sugawara |
| 8,228,046 B2 | 7/2012 | Ingemi et al. |
| 8,248,145 B2 | 8/2012 | Melanson |
| 8,270,190 B2* | 9/2012 | Adragna ..................... 363/89 |
| 8,279,630 B2 | 10/2012 | Choi |
| 8,558,518 B2* | 10/2013 | Irissou et al. ................ 323/237 |
| 8,587,970 B2 | 11/2013 | Uno et al. |
| 8,830,702 B2* | 9/2014 | Macfarlane .................... 363/17 |
| 8,890,497 B2 | 11/2014 | Peschke |
| 2006/0255772 A1 | 11/2006 | Chen |
| 2007/0036212 A1 | 2/2007 | Leung et al. |
| 2008/0252268 A1 | 10/2008 | Feldtkeller et al. |
| 2011/0109283 A1 | 5/2011 | Kapels et al. |
| 2011/0193494 A1 | 8/2011 | Gaknoki et al. |
| 2011/0205763 A1 | 8/2011 | Artusi et al. |
| 2011/0280053 A1 | 11/2011 | Halberstadt |
| 2012/0014150 A1 | 1/2012 | Domb |
| 2012/0069615 A1 | 3/2012 | Tomioka |
| 2012/0106216 A1 | 5/2012 | Tzinker et al. |
| 2012/0120696 A1 | 5/2012 | Nishijima |
| 2012/0126759 A1 | 5/2012 | Lee et al. |
| 2012/0146529 A1 | 6/2012 | Campbell et al. |
| 2012/0169313 A1 | 7/2012 | Lee et al. |
| 2012/0187863 A1 | 7/2012 | Nonaka et al. |
| 2013/0088904 A1 | 4/2013 | Yamanaka et al. |
| 2013/0187623 A1 | 7/2013 | Harel |
| 2013/0320882 A1 | 12/2013 | Gaknoki et al. |
| 2013/0322139 A1 | 12/2013 | Lee et al. |
| 2014/0003105 A1* | 1/2014 | Lin et al. ..................... 363/84 |
| 2014/0078798 A1 | 3/2014 | Turchi |
| 2014/0097808 A1* | 4/2014 | Clark et al. ................ 323/208 |
| 2014/0320096 A1 | 10/2014 | Pansier |
| 2014/0327411 A1* | 11/2014 | Gumaer ...................... 323/208 |
| 2014/0328096 A1 | 11/2014 | Gumaer |
| 2014/0328097 A1* | 11/2014 | Gumaer ........................ 363/89 |
| 2014/0328415 A1* | 11/2014 | Gumaer ........................ 375/257 |

FOREIGN PATENT DOCUMENTS

| | | |
|---|---|---|
| KR | 2009005011 | 5/2009 |
| SU | 288182 | 12/1970 |
| WO | 2005041393 | 5/2005 |

OTHER PUBLICATIONS

Lopatkina, R., International Search Report and Written Opinion of the International Searching Authority for PCT/US2014/036256, Sep. 17, 2014, pp. 1-7.

Golovinova, I., International Search Report and Written Opinion of the International Searching Authority for PCT/US2014/036252, Sep. 17, 2014, pp. 1-7.

Fairchild Semiconductor Corporation, Application Note 42047 Power Factor Correction (PFC) Basics, Aug. 19, 2004, 11 pages, Fairchild Semiconductor Corporation.

Golovinova, I., International Search Report and Written Opinion of the International Searching Authority for PCT/US2014/036254, Oct. 3, 2014, pp. 1-7.

* cited by examiner

ACTIVE POWER FACTOR CORRECTION CIRCUIT FOR A CONSTANT CURRENT POWER CONVERTER

TECHNICAL FIELD

The present disclosure relates generally to power factor correction. Specifically, the present disclosure relates to techniques for providing power factor correction on a system having a constant current input.

BACKGROUND

Power factor correction is often used in electric power systems and between power sources and loads in order to synchronize the input current and the input voltage before it is delivered to the load. Power factor correction can provide many benefits to the electric power system and the load, such as prolonged life and energy efficiency.

Traditionally, power factor correction circuitry is designed as voltage-based power factor correction. Such circuitry is used in constant voltage systems, and the input current waveform is made to match the input voltage waveform. However, in certain industries, such as airfield lighting, the existing infrastructure requires current based systems which require a constant current power source rather than a constant voltage power source. Specifically, in the area of airfield lighting, constant current systems are traditionally used because of the need for consistent brightness across the plurality of light fixtures coupled in series and being powered by the same power source. Because a constant current power supply can provide the same level of current to each of the light fixtures, it became the standard form of power distribution in the area of airfield lighting. Though lighting technology has become more sophisticated, the infrastructure has remained a current based system. However, power factor correction techniques used for voltage based systems which receive a constant voltage generally cannot be used for current based systems.

SUMMARY

In an example embodiment of the present disclosure, a constant current power factor correction circuit includes an input capacitor configured to receive an input current from a constant current source and produce an input voltage. The circuit also includes a rectifier bridge configured to receive the input current and full-wave rectify the input current. A controller senses the input current and the input voltage and provides a reference voltage. The circuit further includes a switching device coupled to the controller, wherein the switching device is switchable between a first state and a second state. When the switching device is in the first state, the input capacitor is charged from the input current and the input voltage rises, and when the switching device is in the second state, the input capacitor is drained and the input voltage drops, wherein the switching device switches from the first state to the second state when the input voltage reaches the reference voltage. The circuit also includes a DC output bus providing an output voltage, wherein the output voltage is a conditioned form of the input voltage, wherein the input voltage is in phase with the input current from the constant current source.

In another example embodiment of the present disclosure, a constant current power factor correction circuit includes an input capacitor configured to receive an input current from a constant current source and produce an input voltage, wherein the input current comprises an input current waveform. The circuit also includes a switching device switchable between a first state and an second state. When the switching device is in the first state, the input capacitor is charged from the input current and the input voltage rises. When the switching device is in the second state, the input capacitor is drained and the input voltage drops. Switching back and forth between the first state and the second state gives the input voltage a substantially sinusoidal waveform, wherein the sinusoidal waveform matches the input current waveform. The circuit further includes a controller coupled to the switching device, wherein the controller controls switching of the switching device.

In another example embodiment of the present disclosure, a method of power factor correction on a constant current system includes receiving an input current from a constant current input source, the input current having a current waveform. The method also includes allowing an input capacitor to charge from the input current, wherein an input voltage formed at the input capacitor rises as the input capacitor charges. The method further includes determining if the input voltage reaches a reference voltage, and switching a switching device from a first state to a second state when the input voltage reaches the reference voltage. The method includes allowing the input capacitor to drain, wherein the input voltage drops as the input capacitor drains. The method also includes shaping the input voltage to have a voltage waveform similar to the current waveform by controlling the switching of the switching device.

BRIEF DESCRIPTION OF THE DRAWINGS

For a more complete understanding of the disclosure and the advantages thereof, reference is now made to the following description, in conjunction with the accompanying figures briefly described as follows.

Figure 1:
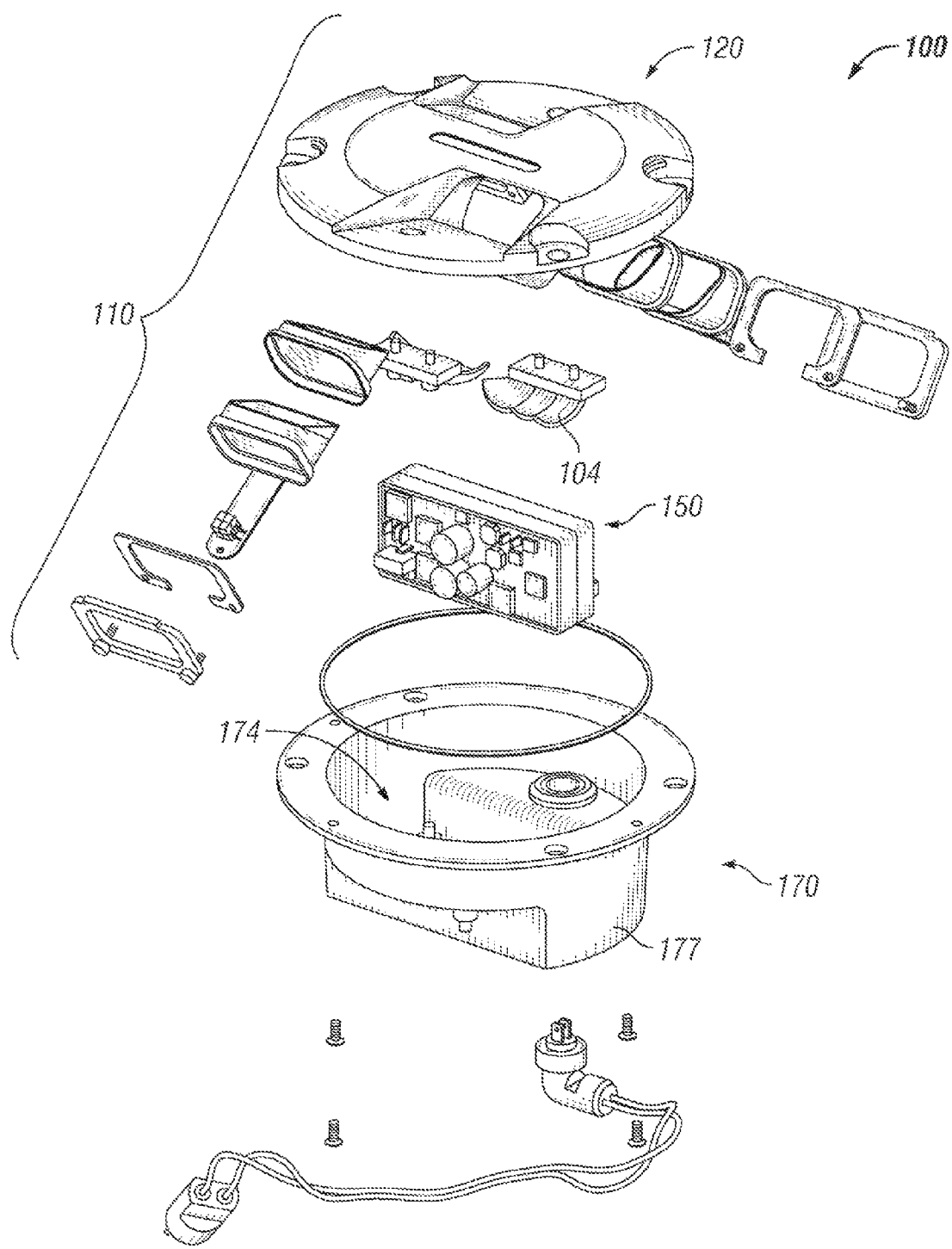
FIG. 1 illustrates a light fixture powered by a constant current system and having a power factor correction circuit, in accordance with an example embodiment of the present disclosure.

The drawings illustrate only example embodiments of the disclosure and are therefore not to be considered limiting of its scope, as the disclosure may admit to other equally effective embodiments. The elements and features shown in the drawings are not necessarily to scale, emphasis instead being placed upon clearly illustrating the principles of example embodiments of the present disclosure. Additionally, certain dimensions may be exaggerated to help visually convey such principles.

DETAILED DESCRIPTION OF EXAMPLE EMBODIMENTS

In the following paragraphs, the present disclosure will be described in further detail by way of examples with reference to the attached drawings. In the description, well known components, methods, and/or processing techniques are omitted or briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s). The present disclosure provides systems and methods of power factor correction for a power converter operating on a constant current input source. The present disclosure is directed towards power distribution systems in the area of airfield lighting as an example application, but may be used with any other appropriate power distribution systems operating on a constant current input source.

In certain example embodiments, the present disclosure provides a power factor correction circuit for use in systems with constant current input sources. In one example, the power factor correction circuit is used in an airfield lighting system which includes a plurality of individual light fixtures. Each of the light fixtures receives a constant current power supply from a central power source. In certain example embodiments, each or a subset of the light fixtures includes the power factor correction circuit disclosed herein, which improves the energy efficiency of the light fixtures.

FIG. 1 shows an exploded perspective view of one such light fixture 100 in accordance with certain example embodiments. Referring now to FIG. 1, the light fixture 100 is an example of an airport runway and/or taxiway light fixture. The light fixture 100 of FIG. 1 includes a frame, a light source 104, and a power supply 150. The frame can include a cover 170 and optical housing 120. The light fixture 100 further includes an optical housing assembly 110. The optical housing assembly 110 includes the combination of one or more components associated with the mechanical structure and configuration of the optical housing 120 and other optical components, such as a body, lens, diffuser, connectors, and the like.

In certain example embodiments, the cover 170 includes at least one wall 177 that forms a cavity 174. Inside of the cavity 174 can be positioned at least one or more light sources 104 and the power supply 150. The cover 170 can include one or more features (e.g., ledges, apertures) that allow the various components disposed in the cavity 174 to fit and maintain electrical, mechanical, and/or thermal coupling with each other. The optical housing 120 protects the components disposed within the cavity 174, and can also secure the light sources 104 and the other internal components 130.

The power supply 150 includes one or more circuits and electrical components configured to receive the constant current input from the central power source, condition the received current, and drive the light sources 104. In certain example embodiments, the power supply includes the power factor correction circuit disclosed herein, such that the constant current input is conditioned for power factor correction before it is supplied to the light sources 104, thereby improving energy efficiency.

Figure 2:
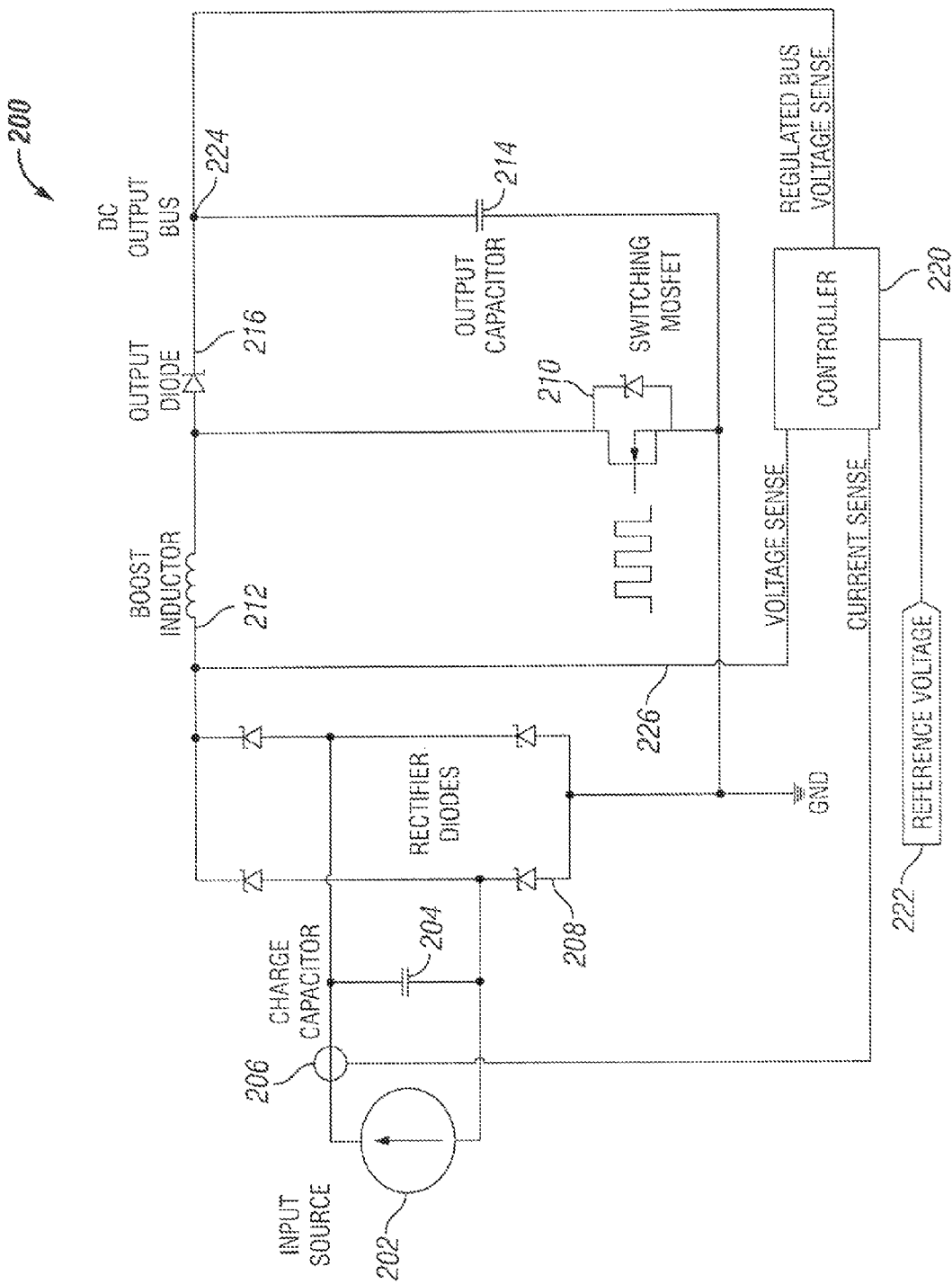
FIG. 2 illustrates a schematic diagram of a power factor correction circuit having a constant current input, in accordance with an example embodiment of the present disclosure.

FIG. 2 illustrates a schematic diagram of a constant current power factor correction (PFC) circuit 200, in accordance with an example embodiment of the present disclosure. In certain example embodiments, the constant current PFC circuit 200 includes an input source 202, an input charging capacitor 204, a diode rectifier bridge 208, an inductor 212, a controller 220, a switching device 210, an output diode 216, an output capacitor 214, and a DC output bus 224. The input source 202 provides a constant current power supply to the circuit 200. In certain example embodiments, the input source 202 provides a 6.6 amp, 60 hertz, sine wave. In certain example embodiments, the input source 202 is directly coupled to the diode rectifier bridge 208 and the input charging capacitor 204. Thus, the input current is rectified by the diode rectifier bridge 208. The input current from the constant current input source 202 also charges the input charging capacitor 204 when the switching device 210 is off. In certain example embodiments, the switch device 210 is a switching MOSFET.

In certain example embodiments, the switching device 210 is initially off. Thus, the input current from the constant current input source 202 charges the input charging capacitor 104. As the input current charges the input charging capacitor 204, a voltage rise occurs in the input charging capacitor 204. When the voltage rises to a certain threshold level, the switching device 210 is switched on. In certain example embodiments, the threshold level is determined by a reference voltage 222 such that the voltage at the input charging capacitor is allowed to rise until it reaches the level of the reference voltage 222. In certain example embodiments, the controller 220 provides the reference voltage 222 and also receives a sensed voltage signal 226 of the voltage at the input charging capacitor 204. The controller 220 also receives a sensed current signal 206 from the input current. In certain example embodiments, the reference voltage is a sine wave which has been synchronized with the phase of the input current. The reference voltage also has an amplitude indicative of the level of desired output power. The controller 220 compares a sensed voltage signal 226 to the reference voltage 222 and controls the switching device 210 accordingly. The controller 220 will be described in further detail below with respect to FIG. 3.

When the voltage at the input charging capacitor 204 reaches the reference voltage 222, the switching device 210 is switched on. When the switching device 210 is switched on, current is drained from the input charging capacitor 204 and the voltage drops accordingly. Thus, voltage at the input charging capacitor 204 rises when the switching device 210 is off and drops when the switching device 210 is on, creating a waveform which follows the duty cycle of the switching device 210. During the time the switching device 210 is on, current rises in the inductor 212. Thus, when the switching device 210 is switched off again, the inductor flies back and delivers energy, which is rectified by the output diode 216, to the output capacitor 214. The voltage at the output capacitor 214 is provided to a DC output bus 224 and configured to be delivered to a load. As the switching device 210 switches at a high frequency (hundreds of kHz) according to a controlled duty cycle, the instantaneous voltage at the input charge capacitor 204 will match the reference voltage each cycle. Thus, a sine wave input voltage in which the waveform is matched to the waveform of the input current is created over time.

In another example embodiment, the controller 220 does not necessarily monitor the input voltage 226. Rather, the switching device 210 is provided with a pulse width modulation signal shaped like a sine wave regardless of the input voltage 226, as further discussed below, which forces the input voltage 226 to take on a waveform as defined by the pulse width modulation signal, thereby matching the input voltage waveform to the input current waveform.

Figure 3:
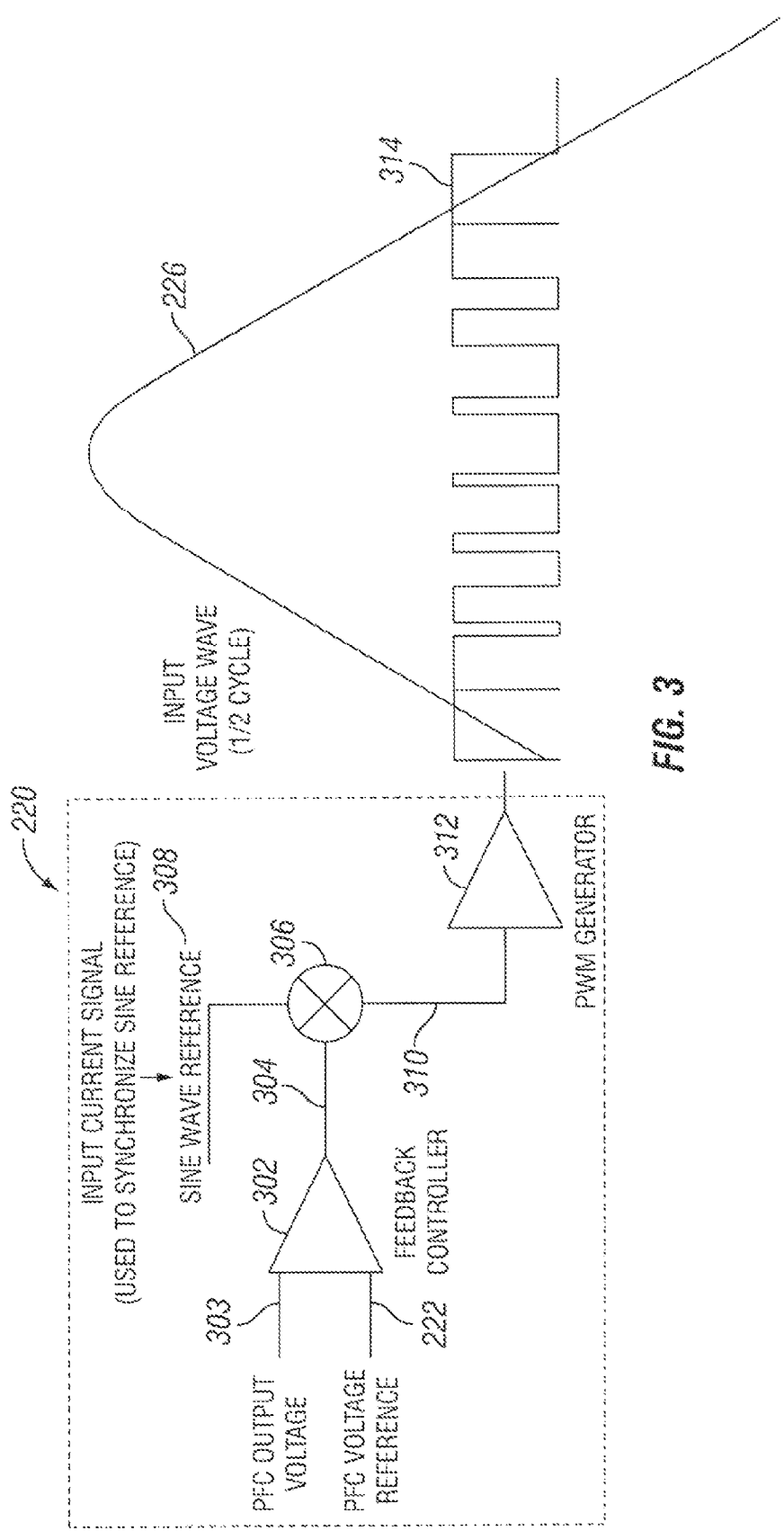
FIG. 3 illustrates a diagram of a controller of the power factor correction circuit of FIG. 1, in accordance with an example embodiment of the present disclosure.

FIG. 3 illustrates a diagrammatical representation of the controller 220 of FIG. 2, in accordance with an example embodiment. The controller 220 includes a feedback controller 302 which receives, as inputs, a sense output voltage 303 from the DC output bus 224 and the reference voltage 222. The value of the reference voltage 222 is typically selected according to the desired amount of power to be provided at the DC output bus 224. The value of the sensed output voltage 303 is compared with the value of reference voltage 222. If the value of the sensed output voltage 303 is below the value of the reference voltage 222, the output 304 of the feedback controller 302 will increase. If the value of the sensed output voltage 303 is above the value of the reference voltage 222, the output 304 of the feedback controller 302 will decrease. The output 304 of the feedback controller 302 is then multiplied 306 by a sine wave reference 308. In certain example embodiments, the input current signal 206 is applied to the sine wave reference 308 to synchronize the sine wave reference 308 with the input current signal 206. Thus, the output 310 of the multiplication 306 of the sine wave reference 308 and the feedback control output 304 is a sine wave 310 which varies in amplitude with the feedback controller output 304.

In certain example embodiments, the controller 220 further includes a pulse width modulation (PWM) generator 312. The PWM generator 312 receives as input, the sine wave 310 and converts the sine wave 310 into a pulse width modulation signal 314. The pulse width modulation signal 314 is used to drive the switching device 210 (FIG. 2). In certain example embodiments, the duty cycle of the pulse width modulation signal 314 decreases to increase the input voltage 226, and the pulse modulation signal 314 increases to decrease the input voltage 226. At the peaks of the sine wave 310, the pulse width modulation signal 314 is at its controlled minimum, and the input voltage is at its peak. Thus, the peaks of the input voltage waveform are matched to the peaks of the sine wave 310, which has been synchronized with the input current 206. Therefore, the input voltage waveform is matched to that of the input current 206.

Figure 4:
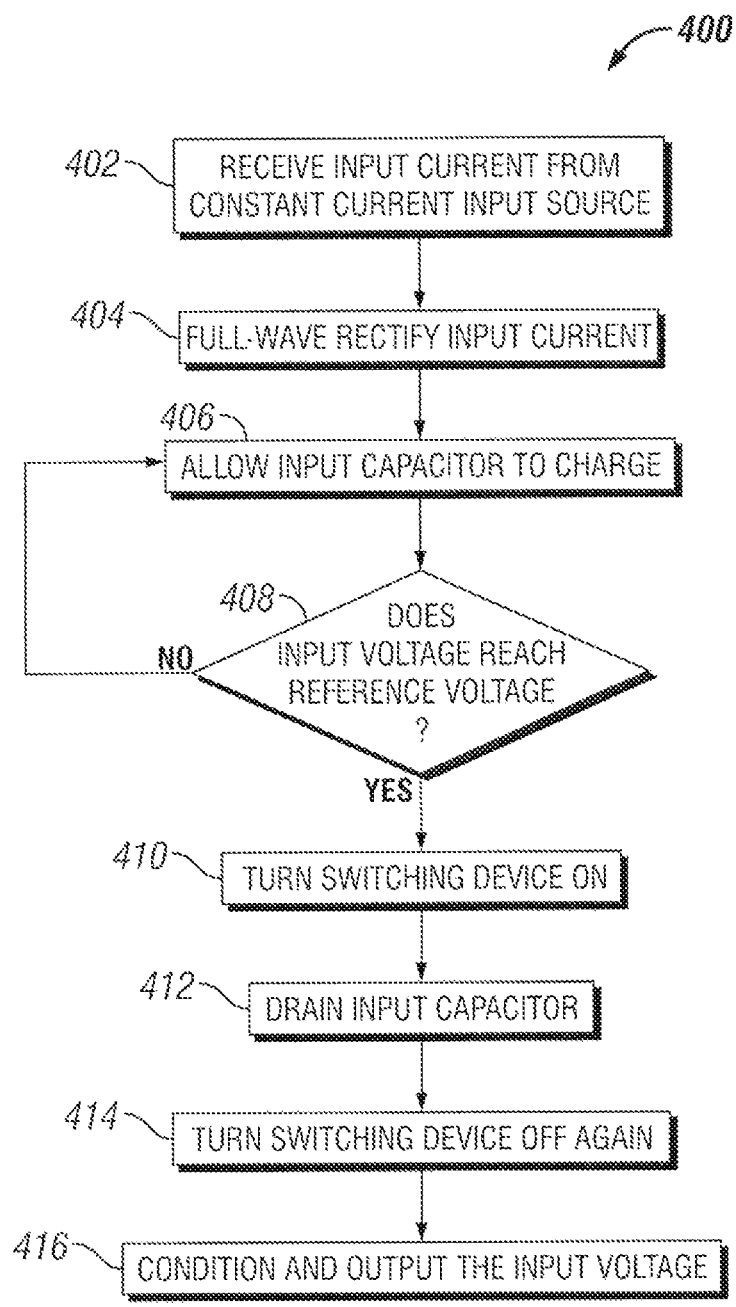
FIG. 4 illustrates a flow chart of a method of current-based power factor correction, in accordance with an example embodiment of the present disclosure.

FIG. 4 illustrates a method of power factor correction 400 for a constant current system, in accordance with an example embodiment. Specifically, in certain example embodiments, the method of power factor correction 400 is implemented via the power factor correction circuit of FIG. 2. Referring to FIGS. 2 and 4, the method of power factor correction 400 includes receiving an input current from a constant current input source 202 (step 402). The method 400 further includes full-wave rectifying the input current (step 404). In certain example embodiments, the diode rectifier bridge 208 full-wave rectifies the input current. In certain other example embodiments, the rectification is carried out by an alternate rectification device. The method 400 further includes allowing the input capacitor 204 to be charged (step 406). Specifically, in certain example embodiments, the switching device 210 is initially in the off state. As previously discussed, when the switching device 210 is in the off state, the input capacitor charges, and the input voltage increases. In certain example embodiments, the input voltage is constantly being monitored by the controller 220 via the input voltage sense 226. The method further includes determining whether the input voltage has reached the reference voltage (block 408). In certain example embodiments, the reference voltage includes an amplitude indicative of the desired level of power output as well as a phase which is synchronized with the input current.

In order to make the determination, the controller 220 compares the value of the input voltage to the value of the reference voltage. If it is determined that the input voltage is less than the reference voltage, the method goes to step 406, in which the switching device 210 remains off and the input capacitor is allowed to charge. In certain example embodiments, steps 406 and 408 are repeated until it is determined at step 408 that the input voltage has reached the reference voltage. In certain example embodiments, the controller 220 constantly monitors the input voltage and reacts when the sensed voltage value reaches a threshold representative of the reference voltage. When it is determined that the input has reached the reference voltage, the switching device 210 switches on (step 410) and the input capacitor drains (step 412). Likewise, the input voltage drops. The method 400 further includes switching the switching device off again (414) to allow the input voltage to rise again, forming a sinusoidal waveform. The method 400 also includes continuously conditioning and outputting the input voltage via a DC output bus 224 (step 416). In certain example embodiments, the input voltage is filtered by the inductor 212 and rectified by the output diode 216. With such a method, the voltage output of a constant current power correction circuit is made to match and follow the phase of the constant current input current. Thus, power efficiency is improved.

The present disclosure provides techniques for power factor correction on a constant current system by matching the voltage waveform to the input current waveform. Although embodiments of the present disclosure have been described herein in detail, the descriptions are by way of example. The features of the disclosure described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

What is claimed is:

1. A constant current power factor correction circuit, comprising:
    an input capacitor configured to receive an input current from a constant current source and produce an input voltage;
    a rectifier bridge configured to receive the input current and full-wave rectify the input current;
    a controller, wherein the controller senses the input current and the input voltage and continuously monitors the input voltage and compares the input voltage to a reference voltage;
    a switching device coupled to the controller, wherein the switching device is switchable between a first state and an second state, wherein when the switching device is in the first state, the input capacitor is charged from the input current and the input voltage rises, and when the switching device is in the second state, the input capacitor is drained and the input voltage drops, wherein the controller switches the switching device from the first state to the second state when the input voltage reaches the reference voltage; and
    a DC output bus providing an output voltage, wherein the output voltage is a conditioned form of the input voltage, wherein the input voltage is shaped to be in phase with the input current from the constant current source.

2. The constant current power factor correction circuit of claim 1, wherein the switching device comprises a switching MOSFET.

3. The constant current power factor correction circuit of claim 1, wherein the reference voltage comprises an amplitude representative of a desired power level to be output at the DC output bus.

4. The constant current power factor correction circuit of claim 1, wherein the switching device comprises a duty cycle, and wherein the input voltage is controlled by controlling the duty cycle.

5. The constant current power factor correction circuit of claim 4, wherein the duty cycle of the switching device is synchronized with the input current.

6. The constant current power factor correction circuit of claim 1, wherein the controller generates a pulse width modulation signal which drives the switching device.

7. A constant current power factor correction circuit, comprising:
- an input capacitor configured to receive an input current from a constant current source and produce an input voltage, wherein the input current comprises an input current waveform;
- a switching device switchable between a first state and an second state, wherein when the switching device is in the first state, the input capacitor is charged from the input current and the input voltage rises, and when the switching device is in the second state, the input capacitor is drained and the input voltage drops, wherein switching back and forth between the first state and the second state gives the input voltage a substantially sinusoidal waveform, wherein the sinusoidal waveform matches the input current waveform; and
- a controller coupled to the switching device, wherein the controller controls switching of the switching device, wherein the controller monitors the input voltage and compares the input voltage to a reference voltage, and wherein the controller switches the switching device from the first position to the second position when the input voltage reaches the reference voltage.

8. The constant current power factor correction circuit of claim 7, wherein the controller further comprises:
- a feedback controller, wherein the feedback controller receives and compares a rectified input voltage and the reference voltage and produce an adjustment signal, wherein the adjustment signal increases when the rectified input voltage is below the reference voltage and decreases when the rectified input voltage is above the reference voltage, and wherein the adjustment signal is multiplied with a reference wave synchronized with the input current waveform, generating a control reference signal used to control switching of the switching device.

9. The constant current power factor correction circuit of claim 8, wherein the controller further comprises:
- a pulse width modulation (PWM) controller, wherein the PWM controller receives the control reference signal and generates a corresponding PWM signal, and wherein the PWM signal drives the switching of the switching device.

10. The constant current power factor correction circuit of claim 7, wherein the switching device comprises a switching MOSFET.

11. The constant current power factor correction circuit of claim 7, wherein the reference voltage comprises an amplitude representative of a desired power level.

12. The constant current power factor correction circuit of claim 7, further comprising:
- an output bus configured to receive the input voltage and provide an output voltage to a load, wherein the output voltage is a conditioned form of the input voltage.

13. A method of power factor correction on a constant current system, comprising:
- receiving an input current from a constant current input source, the input current having a current waveform;
- allowing an input capacitor to charge from the input current, wherein an input voltage formed at the input capacitor rises as the input capacitor charges;
- monitoring, by a controller, the input voltage and determining if the input voltage reaches a reference voltage;
- switching, by the controller, a switching device from a first state to a second state when the input voltage reaches the reference voltage;
- allowing the input capacitor to drain, wherein the input voltage drops as the input capacitor drains; and
- shaping the input voltage to have a voltage waveform similar to the current waveform by controlling the switching of the switching device.

14. The method of power factor correction on a constant current system of claim 13, further comprising:
- outputting the input voltage via an output bus.

15. The method of power factor correction on a constant current system of claim 14, further comprising:
- filtering and rectifying the input voltage to produce a DC voltage; and
- outputting the DC voltage via a DC output bus.

16. The method of power factor correction on a constant current system of claim 13, further comprising:
- full-wave rectifying the input current.

17. The method of power factor correction on a constant current system of claim 13, wherein the switching device comprises a switching MOSFET.

* * * * *